(12) United States Patent
Vaughn et al.

(10) Patent No.: US 6,509,290 B1
(45) Date of Patent: Jan. 21, 2003

(54) CATALYST COMPOSITION INCLUDING ATTRITION PARTICLES AND METHOD FOR MAKING SAME

(75) Inventors: Stephen N. Vaughn, Kingwood, TX (US); Luc R. M. Martens, Meise (BE); Keith H. Kuechler, Friendswood, TX (US); Albert E. Schweizer, Baton Rouge, LA (US)

(73) Assignee: Exxon Mobil Chemical Patents, Inc., Houston, TX (US)

( * ) Notice: Subject to any disclaimer, the term of this patent is extended or adjusted under 35 U.S.C. 154(b) by 0 days.

(21) Appl. No.: 09/617,714

(22) Filed: Jul. 17, 2000

(51) Int. Cl.[7] .......................... B01J 27/182; B01J 29/06
(52) U.S. Cl. ................... 502/214; 502/63; 423/DIG. 30
(58) Field of Search ............. 502/63, 214; 423/DIG. 30

(56) References Cited

U.S. PATENT DOCUMENTS

| | | | | |
|---|---|---|---|---|
| 4,440,871 A | | 4/1984 | Lok et al. .................... 502/214 |
| 4,734,185 A | * | 3/1988 | Pellet et al. ................. 208/114 |
| 4,814,316 A | * | 3/1989 | Pellet et al. ................. 502/214 |
| 4,818,739 A | * | 4/1989 | Gortsema et al. ........... 502/214 |
| 4,914,067 A | * | 4/1990 | Pellet et al. ................... 502/63 |
| 4,988,653 A | | 1/1991 | Herbst et al. ................. 502/67 |
| 5,006,497 A | * | 4/1991 | Herbst et al. ................. 502/67 |
| 5,039,640 A | * | 8/1991 | Absil et al. ................... 502/67 |
| 5,369,071 A | | 11/1994 | Degnan et al. ............... 502/71 |
| 5,672,556 A | | 9/1997 | Pinnavaia et al. ............ 502/63 |

FOREIGN PATENT DOCUMENTS

| | | | |
|---|---|---|---|
| DE | 4440231 A1 | * | 7/1995 |
| WO | WO 97/45196 | * | 12/1997 |

* cited by examiner

Primary Examiner—Mark L. Bell
Assistant Examiner—Patricia L. Hailey

(57) ABSTRACT

Disclosed is a molecular sieve catalyst which contains molecular sieve-containing attrition particles and virgin molecular sieve, the attrition particles having been recycled from a catalyst manufacture process or from a reaction system. The catalyst can be used in a variety of catalytic reaction processes. A desired process is making olefins from an oxygenate feedstock. The recovery and use of the attrition particles in the catalyst is beneficial in minimizing waste, thereby reducing problems relating to both environmental and economic constraints.

22 Claims, 2 Drawing Sheets

CATALYST COMPOSITION INCLUDING ATTRITION PARTICLES AND METHOD FOR MAKING SAME

FIELD OF THE INVENTION

This invention relates to a catalyst which comprises molecular sieve-containing catalyst attrition particles. In particular, the invention is to a catalyst which contains molecular sieve-containing attrition particles and virgin molecular sieve, the attrition particles having been recycled from a catalyst manufacture process or from a reaction system.

BACKGROUND OF THE INVENTION

A molecular sieve is generally a microporous structure composed of either crystalline aluminosilicate, chemically similar to clays and feldspars and belonging to a class of materials known as zeolites, or crystalline aluminophosphates derived from mixtures containing an organic amine or quaternary ammonium salt, or crystalline silicoaluminophosphates which are made by hydrothermal crystallization from a reaction mixture comprising reactive sources of silica, alumina and phosphate. Molecular sieves have a variety of uses. They can be used to dry gases and liquids; for selective molecular separation based on size and polar properties; as ion-exchangers; as catalysts in cracking, hydrocracking, disproportionation, alkylation, isomerization, oxidation, and conversion of oxygenates to hydrocarbons, particularly alcohol and di-alkyl ether to olefins; as chemical carriers; in gas chromatography; and in the petroleum industry to remove normal paraffins from distillates.

Molecular sieves are manufactured by reacting a mixture of several chemical components. One of the components used in the reaction process is a template, although more than one template can be used. The templates are used to form channels or tunnel like structures (also called a microporous structure) within the composition. When the template is removed, an open microporous structure is left behind in which chemical compositions can enter, as long as the chemical compositions are small enough to be able to fit inside the tunnels. Thus a molecular sieve acts to sieve or screen out large molecules from entering a molecular pore structure.

Molecular sieves are particularly desirable for use as catalytic agents. The molecular sieves that act as catalysts have catalytic sites within their microporous structures. Once the template is removed, a chemical feedstock that is small enough to enter into the tunnels can come into contact with a catalytic site, react to form a product, and the product can leave the molecular sieve through any number of the tunnels or pores as long as the product has not become too large to pass through the structure. The pore sizes typically range from around 2 to 10 angstroms in many catalytic molecular sieves.

To be useful in commercial scale catalytic reaction systems, molecular sieves are generally composited with other catalytic or inert structure affecting components to form finished catalyst particles. Such particles are described, for example, in U.S. Pat. No. 4,499,327.

Although finished catalyst particles are generally harder than the molecular sieve components, they are prone to damage due to physical stresses encountered during the manufacture of the finished catalyst particles or during the use of the finished catalyst particles in a reaction system. This damage tends to physically wear down or break apart (i.e., attrit) the catalyst particle until it is too small to efficiently recapture for reuse. The attritted particle (or catalyst fine) is then discarded as waste from the system in which it is used.

In the manufacture of finished catalyst particles, there may also be produced particles that are too large for subsequent use in a reaction system. For example, through misoperation of equipment or transient operations at the beginning or end of one cycle of a batch catalyst manufacturing operation, large clumps or sheets of the sieve or composite material may form on the walls or floors of equipment. The clumps are then discarded as a loss in the catalyst manufacturing process.

The discarding of catalyst attrition particles or oversized catalyst clumps is problematic from an economic standpoint. Therefore, methods for effectively recovering and reusing these attrition particles and clumps are highly desired.

SUMMARY OF THE INVENTION

In order to limit losses of molecular sieve-containing catalyst attrition particles and/or clumps during manufacture or during use, this invention provides a catalyst composition which comprises molecular sieve-containing catalyst attrition particles; virgin molecular sieve; and binder. The virgin molecular sieve can comprise dried catalyst fines in catalyst clumps, while the molecular sieve-containing catalyst attrition particles comprise calcined molecular sieve catalyst particles which contain molecular sieve and binder.

In another embodiment, the invention is to a method of making a molecular sieve catalyst composition which comprises mixing together molecular sieve-containing catalyst attrition particles, virgin molecular sieve components and binder. The mixture is then spray dried to form the molecular sieve catalyst composition.

In yet another embodiment, the invention is to a method of making olefins from an oxygenate feedstock. The method comprises providing a catalyst composition containing molecular sieve-containing catalyst attrition particles, virgin molecular sieve, and binder; and contacting the catalyst composition with oxygenate to form an olefin product.

The invention also includes a method of recycling molecular sieve-containing catalyst attrition particles to form a catalytic composition. The method comprises recovering the molecular sieve-containing catalyst attrition particles from a calciner process unit; mixing at least 40% the recovered molecular sieve-containing catalyst attrition particles with virgin molecular sieve components; and compositing the mixture to form a catalyst composition.

Desirably, the molecular sieve-containing catalyst attrition particles have a catalytic activity of at least 25%. It is also desirable that the catalyst composition have an average particle diameter which ranges from 40 $\mu$m to 150 $\mu$m, and the molecular sieve-contains catalyst attrition particles which have an average particle diameter of less than 20% of the average particle diameter of the catalyst composition. In a desired embodiment, the molecular sieve-containing catalyst attrition particles comprise less than 20 wt. % coke.

In another desired embodiment of the invention, the molecular sieve of the molecular sieve-containing catalyst attrition particles is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof More preferably the molecular sieve of the molecular sieve containing catalyst attrition particles is selected from the group consisting of SAPO-17, SAPO-18, SAPO-34, SAPO-35, SAPO-44, and SAPO-47; most preferably SAPO-18 and SAPO-34, including the metal containing forms thereof, and mixtures thereof.

The molecular sieve in the molecular sieve-containing catalyst attrition particles and the virgin molecular sieve can have the same framework composition or they can have different framework compositions. In addition, the catalyst can further comprise erosion material selected from the group consisting of aluminum, iron, cobalt, vanadium, nickel, silicon, and combinations thereof.

The oxygenate that is made using the catalyst composition of this invention is preferably selected from the group consisting of methanol; ethanol; n-propanol; isopropanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof More preferably, the oxygenate is methanol, dimetyl ether, or a combination thereof. The olefin product preferably comprises ethylene, propylene or a combination thereof.

The reaction process readily takes place when the catalyst composition is contacted with the oxygenate feed. Preferably, the catalyst composition is contacted with the oxygenate at a temperature of from 200° C. to 700° C.; a weight hourly space velocity of from 1 $hr^{-1}$ to 1000 $hr^{-1}$; and a pressure of from 0.5 kPa to 5 MPa.

BRIEF DESCRIPTION OF THE DRAWINGS

The present invention will be better understood by reference to the Detailed Description of the Invention when taken together with the attached drawings, wherein.

DETAILED DESCRIPTION OF THE INVENTION

Figure 1:
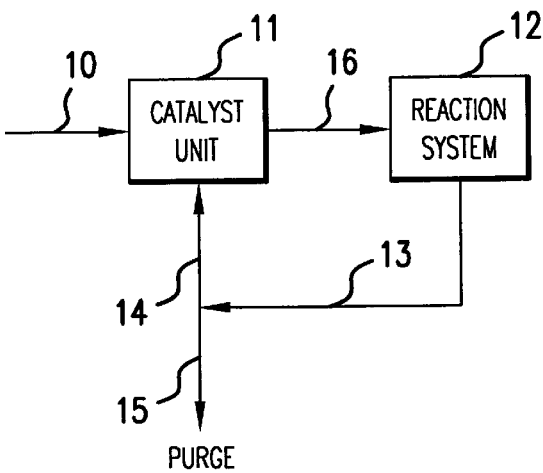
FIG. 1 shows a general recovery scheme of attrition particles from a reaction process.

This invention significantly reduces the loss of molecular sieve-containing catalyst as a result of attrition or clumping. According to this invention, attrition is a physical decrease in catalyst particle size which occurs during the catalyst manufacture process or during the use of the catalyst in a reaction process. Attrition particles are smaller than desired catalyst particles which exit the catalyst manufacture process or reaction process. Clumping is the physical aggregation of catalyst particle material that takes place in the catalyst manufacturing process. Clumps are larger than desired catalyst particles which exit or are rejected from the catalyst manufacturing process.

During the catalyst manufacturing process, attrition and clumping can occur as the catalyst components are composited and physically manipulated to provide a catalyst having a desired size as well as other properties. The term composite, including its associated verb forms, refers to a combination of two or more materials that form a solid unit (e.g., a particle) in the finished state. Thus, in the manufacture of a molecular sieve-containing catalyst, attrition and clumping can occur as the catalyst components are combined and subjected to various physical processes to form particles in the finished state. Though attrition may occur at many steps in the catalyst manufacturing process, the two largest contributors are drying and calcination. As a result of attrition, what is typically known as catalyst fines are formed. As a result of clumping, what is typically known as catalyst clumps are formed. This invention provides a way to reincorporate those catalyst fines and clumps into the finished catalyst particles, thereby reducing catalyst loss.

Attrition also occurs in conventional reaction processes which use molecular sieve-containing catalysts. In these processes, attrition is typically the result of relatively harsh environmental conditions to which the catalyst is exposed during the overall reaction process. These conditions include extreme temperatures as well as mechanical stresses that the catalyst encounters. Catalyst fines are produced as a result of the harsh conditions in the reaction process, and this invention provides for recovering those fines and reincorporating those fines into a catalyst composition.

The catalyst composition of this invention comprises molecular sieve-containing catalyst attrition particles; virgin molecular sieve; and virgin binder material to hold the attrition particles and virgin molecular sieve particles together. For the purposes of this invention, the adjective "virgin" refers to catalyst components that have not been calcined. Conventional binders and their equivalents can be used, their primary purpose being that of compositing the various catalyst components. Other catalyst components can include those that act as structural aids, or fillers which provide a particular catalyst characteristic, such as heat capacity or added attrition resistance, or surface modifying agents which control surface catalytic activity. In certain cases, a single compound may act as both a virgin binder and a filler. In any event, at least one virgin binder or its equivalent is required.

The molecular sieve components of this invention can be zeolites or nonzeolites, with non-zeolites being desired. In general, the molecular sieves are classified as being microporous materials having 8, 10, or 12 membered ring structures. These ring structures can have an average pore size ranging from about 15 angstroms. Desired are the small pore non-zeolite molecular sieves having an average pore size of less than about 5 angstroms, preferably an average pore size ranging from about 3 to 5 angstroms, more preferably from 3.5 to 4.2 angstroms. These pore sizes are typical of molecular sieves having 8 membered rings.

Conventional crystalline aluminosilicate zeolites having catalytic activity are desirable molecular sieves that can be used in the practice of this invention. Examples of such zeolite materials are described in U.S. Pat. Nos. 3,660,274 and 3,944,482, both of which are incorporated herein by reference. Non-limiting examples of zeolites which can be employed in the practice of this invention, include both natural and synthetic zeolites. These zeolites include zeolites of the structural types included in the "Atlas of Zeolite Structural Types" edited by W. M. Meier and D. H. Olson and published by the Structure Commission of the International Zeolite Association in 1987, the descriptions of which are incorporated herein by reference.

Zeolites typically have silica-to-alumina ($SiO_2/Al_2O_3$) mole ratios of at least about 2, and have uniform pore diameters from about 3 to 15 Angstroms. They also generally contain alkali metal cations, such as sodium and/or potassium and/or alkaline earth metal cations, such as magnesium and/or calcium. In order to increase the catalytic activity of the zeolite, it may be desirable to decrease the alkali metal content of the crystalline zeolite to less than about 5 wt. %, preferably less than about 1 wt. %, and more preferably less than about 0.5 wt. %. The alkali metal content reduction, as is known in the art, may be conducted by exchange with one or more cations selected from the Groups IIB through VIII of the Periodic Table of Elements (the Periodic Table of Elements referred to herein is given in Handbook of Chemistry and Physics, published by the Chemical Rubber Publishing Company, Cleveland, Ohio, 45th Edition, 1664), as well as with hydronium ions or basic adducts of hydronium ions, e.g., $NH_4^+$, capable of conversion to a hydrogen cation upon calcination. Desired cations include rare earths, calcium, magnesium, hydrogen and mixtures thereof. Ion-exchange methods are well known in the art and are described, for example, in U.S. Pat. No. 3,140,249; U.S. Pat. No. 3,142,251 and U.S. Pat. No. 1,423,353, the teachings of which are hereby incorporated by reference.

Examples of zeolites suitable for use in this invention include large pore zeolites, medium pore zeolites, and small pore zeolites. A large pore zeolite generally has a pore size of >7 Å and includes zeolite types such as MAZ, MEI, FAU, EMT. Examples of large pore zeolites include zeolite L, zeolite Y, zeolite X, offretite, omega, Beta, mordenite, ZSM-3, ZSM-4, ZSM-18, and ZSM-20. A medium pore size catalyst generally has a pore size <7 Å, preferably from about 5 Å to about 6.8 Å; and generally the pore apertures consist of about 10 to 12, preferably about 10, membered ring structures and include MFI, MEL, MTW, EUO, MTT, HEU, FER, and TON. Examples of medium pore zeolite include ZSM-34, ZSM-38, and ZSM-48. A small pore size zeolite has a pore size from about 3 Å to about 5.0 Å. Generally, the pore apertures of the structure consist of from about 8 to 10, preferably about 8, membered ring structures and include CHA, ERI, KFI, LEV, and LTA. Examples of small pore zeolite include ZK-4, ZK-5, zeolite A, zeolite T, gmelinite, chinoptilolite, chabasite and erionite. The zeolites can also comprise gallosilicates and titanosilicates.

Non-zeolite molecular sieves can also be used in this invention. Desired non-zeolite molecular sieves are silicoaluminophosphate (SAPO) molecular sieves. SAPO molecular sieves generally comprise a three-dimensional microporous crystal framework structure of $[SiO_2]$, $[AlO_2]$ and $[PO_2]$ corner sharing tetrahedral units. The way Si is incorporated into the structure can be determined by $^{29}Si$ MAS NMR. See Blackwell and Patton, *J Phys. Chem.*, 92, 3965 (1988). The desired SAPO molecular sieves will exhibit one or more peaks in the $^{29}Si$ MAS NMR, with a chemical shift δ (Si) in the range of −88 to −96 ppm and with a combined peak area in that range of at least 20% of the total peak area of all peaks with a chemical shift δ (Si) in the range of −88 ppm to −115 ppm, where the δ (Si) chemical shifts refer to external tetramethylsilane (TMS).

It is desired that the silicoaluminophosphate molecular sieve used in this invention have a relatively low $Si/Al_2$ ratio. In general, the lower the $Si/Al_2$ ratio, the lower the $C_1-C_4$ saturates selectivity, particularly propane selectivity, in an oxygenate conversion reaction, particularly methanol conversion to olefins. A $Si/Al_2$ ratio of less than 0.65 is desirable, with a $Si/Al_2$ ratio of not greater than 0.40 being desired, and a $Si/Al_2$ ratio of not greater than 0.32 being particularly desired. A $Si/Al_2$ ratio of not greater than 0.20 is most desired. Silicoaluminophosphate molecular sieves are generally classified as being microporous materials having 8, 10, or 12 membered ring structures. These ring structures can have an average pore size ranging from about 3.5–15 angstroms. Desired are the small pore SAPO molecular sieves having an average pore size of less than about 5 angstroms, preferably an average pore size ranging from about 3.5 to 5 angstroms, more preferably from 3.5 to 4.2 angstroms. These pore sizes are typical of molecular sieves having 8 membered rings.

In general, isilicoaluminophosphate molecular sieves comprise a molecular framework of corner-sharing $[SiO_2]$, $[AlO_2]$, and $[PO_2]$ tetrahedral units. This type of framework is effective in converting various oxygenates into olefin products.

The $[PO_2]$ tetrahedral units within the framework structure of the molecular sieve of this invention can be provided by a variety of compositions. Examples of these phosphorus-containing compositions include phosphoric acid, organic phosphates such as triethyl phosphate, and aluminophosphates. The phosphorous-containing compositions are mixed with reactive silicon and aluminum-containing compositions under the appropriate conditions to form the molecular sieve.

The $[AlO_2]$ tetrahedral units within the framework structure can be provided by a variety of compositions. Examples of these aluminum-containing compositions include aluminum alkoxides such as aluminum isopropoxide, aluminum phosphates, aluminum hydroxide, sodium aluminate, and pseudoboehmite. The aluminum-containing compositions are mixed with reactive silicon and phosphorus-containing compositions under the appropriate conditions to form the molecular sieve.

The $[SiO_2]$ tetrahedral units within the framework structure can be provided by a variety of compositions. Examples of these silicon-containing compositions include silica sols and silicium alkoxides such as tetra ethyl orthosilicate. The silicon-containing compositions are mixed with reactive aluminum and phosphorus-containing compositions under the appropriate conditions to form the molecular sieve.

Substituted SAPOs can also be used in this invention. These compounds are generally known as MeAPSOs or metal-containing silicoaluminophosphates. The metal can be alkali metal ions (Group IA), alkaline earth metal ions (Group IIA), rare earth ions (Group IB, including the lanthanide elements: lanthanum, cerium, praseodymium, neodymium, samarium, europium, gadolinium, terbium, dysprosium, holmium, erbium, thulium, ytterbium and lutetium; and scandium or yttrium) and the additional transition cations of Groups IVB, VB, VIB, VIIB, VIIIB, and IB.

Preferably, the Me represents atoms such as Zn, Mg, Mn, Co, Ni, Ga, Fe, Ti, Zr, Ge, Sn, and Cr. These atoms can be inserted into the tetrahedral framework through a $[MeO_2]$ tetrahedral unit. The $[MeO_2]$ tetrahedral unit carries a net electric charge depending on the valence state of the metal substituent. When the metal component has a valence state of +2, +3, +4, +5, or +6, the net electric charge is between −2 and +2. Incorporation of the metal component is typically accomplished adding the metal component during synthesis of the molecular sieve. However, post-synthesis ion exchange can also be used. In post synthesis exchange, the metal component will introduce cations into ion-exchange positions at an open surface of the molecular sieve, not into the framework itself Suitable silitoaluminophosphate molecular sieves include SAPO-5, SAPQ-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof Desired are SAPO-17, SAPO-18, SAPO-34, SAPO-35, SAPO-44, and SAPO-47, particularly SAPO-18 and SAPO- 34, including the metal containing forms thereof, and mixtures thereof As used herein, the term mixture is synonymous with combination and is considered a composition of matter having two or more components in varying proportions, regardless of their physical state.

An aluminophosphate (ALPO) molecular sieve can also be included in the catalyst composition of this invention. Aluminophosphate molecular sieves are crystalline microporous oxides which can have an $AlPO_4$ framework. They can have additional elements within the framework, typically have uniform pore dimensions ranging from about 3 angstroms to about 10 angstroms, and are capable of making size selective separations of molecular species. More than two dozen structure types have been reported, including zeolite topological analogues. A more detailed description of the background and synthesis of aluminophosphates is found in U.S. Pat. No. 4,310,440, which is incorporated herein by reference in its entirety. Desired ALPO structures are ALPO-5, ALPO-11, ALPO-18, ALPO-31, ALPO-34, ALPO-36, ALPO-37, and ALPO-46.

The ALPOs can also include a metal substituent in its framework. Preferably, the metal is selected from the group consisting of magnesium, manganese, zinc, cobalt, and mixtures thereof These materials preferably exhibit adsorption, ion-exchange and/or catalytic properties similar to aluminosilicate, aluminophosphate and silica aluminophosphate molecular sieve compositions. Members of this class and their preparation are described in U.S. Pat. No. 4,567,029, incorporated herein by reference in its entirety.

The metal containing ALPOs have a three-dimensional microporous crystal framework structure of $MO_2$, $AlO_2$ and $PO_2$ tetrahedral units. These as manufactured structures (which contain template prior to calcination) can be represented by empirical chemical composition, on an anhydrous basis, as:

mR: $(M_xAl_yP_z)O_2$ wherein "R" represents at least one organic templating agent present in the intracrystalline pore system; "m" represents the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved, "x", "y", and "z" represent the mole fractions of the metal "M", (i.e. magnesium, manganese, zinc and cobalt), aluminum and phosphorus, respectively, present as tetrahedral oxides.

The metal containing ALPOs are sometimes referred to by the acronym as MeAPO. Also in those cases where the metal "Me" in the composition is magnesium, the acronym MAPO is applied to the composition. Similarly ZAPO, MnAPO and CoAPO are applied to the compositions which contain zinc, manganese and cobalt respectively. To identify-the various structural species which make up each of the subgeneric classes MAPO, ZAPO, CoAPO and MVAPO, each species is assigned a number and is identified, for example, as ZAPO-5, MAPO-11, CoAPO-34 and so forth.

The silicoaluminophosphate molecular sieves are synthesized by hydrothermal crystallization methods generally known in the art. See, for example, U.S. Pat. Nos. 4,440,871; 4,861,743; 5,096,684; and 5,126,308, the methods of making of which are fully incorporated herein by reference. A reaction mixture is formed by mixing together reactive silicon, aluminum and phosphorus components, along with at least one template. Generally the reaction mixture is sealed and heated, preferably under autogenous pressure, to a temperature of at least 100° C., preferably from 100° C. to 250° C., until a crystalline product is formed. Formation of the crystalline product can take anywhere from around 2 hours to as much as 2 weeks. In some cases, stirring or seeding with crystalline material will facilitate the formation of the product.

Typically, the molecular sieve product is formed in solution. It can be recovered by standard means, such as by centrifugation or filtration. The product can also be washed recovered by the same means, and dried.

As a result of the crystallization process, the recovered sieve contains within its pores at least a portion of the template used in making the initial reaction mixture. The crystalline structure essentially wraps around the template, and the template must be removed so that the molecular sieve can exhibit catalytic activity. Once the template is removed, the crystalline structure that remains has what is typically called an intracrystalline pore system.

In many cases, depending upon the nature of the final product formed, the template may be too large to be eluted from the intracrystalline pore system. In such a case, the template can be removed by a heat treatment process. For example, the template can be calcined, or essentially combusted, in the presence of an oxygen-containing gas, by contacting the template-containing sieve in the presence of the oxygen-containing gas and heating at temperatures from 200° C. to 900° C. In some cases, it may be desirable to heat in an environment having a low oxygen concentration. In these cases, however, the result will typically be a breakdown of the template into smaller components, rather than by the combustion process. This type of process can be used for partial or complete removal of the template from the intracrystalline pore system. In other cases, with smaller templates, complete or partial removal from the sieve can be accomplished by conventional desorption processes such as those used in making standard zeolites.

The reaction mixture can contain one or more templates. Templates are structure directing or affecting agents, and typically contain nitrogen, phosphorus, oxygen, carbon, hydrogen or a combination thereof, and can also contain at least one alkyl or aryl group, with 1 to 8 carbons being present in the alkyl or aryl group. Mixtures of two or more templates can produce mixtures of different sieves or predominantly one sieve where one template is more strongly directing than another.

Representative templates include tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine and combinations thereof. Desired templates are triethylamine, cyclohexylamine, piperidine, pyridine, isopropylamine, tetraethyl ammonium salts, dipropylamine, and mixtures thereof The tetraethylammonium salts include tetraethyl ammonium hydroxide (TEAOH), tetraethyl ammonium phosphate, tetraethyl ammonium fluoride, tetraethyl ammonium bromide, tetraethyl ammonium chloride, tetraethyl ammonium acetate. Desired tetraethyl ammonium salts are tetraethyl ammonium hydroxide and tetraethyl ammonium phosphate.

The SAPO molecular sieve structure can be effectively controlled using combinations of templates. For example, in a particularly desired embodiment, the SAPO molecular sieve is manufactured using a template combination of TEAOH and dipropylamine. This combination results in a particularly desirable SAPO structure for the conversion of oxygenates, particularly methanol and dimethyl ether, to light olefins such as ethylene and propylene.

Molecular sieve and catalyst units may manufacture materials in a batch or continuous process.

The molecular sieves used in this invention are preferably crystalline particles. The crystalline particles are mixed with molecular sieve-containing catalyst attrition particles or clumps and a virgin binder or binder equivalent. Generally, the mixture also comprises water, either introduced along with or added separately to or in admixture with the catalyst components, to provide the mixture with a desired flow property, such as viscosity. The mixture is then physically processed and dried, forming particles of a desired size. The product of the drying process is referred to as a finished catalyst particle, since it incorporates the molecular sieve and other components. The virgin binder or equivalent essentially acts as a "glue" in that it holds the smaller particles within the larger finished catalyst particle together. The finished catalyst particle itself may then be calcined in much the same manner described above for the calcination of the molecular sieve. The calcination of the finished catalyst particle can be used in lieu of calcining the molecular sieve to remove the template from the molecular sieve, and may be performed to provide the finished catalyst particle with increased hardness, or reduced density from the further removal of water or template trapped in the finished catalyst particle.

Freshly manufactured molecular sieves which are incorporated into the catalyst of this invention are also referred to herein as virgin molecular sieves. These molecular sieves preferably include the template material. The term "virgin molecular sieve" specifically means the molecular sieve has not been calcined, either alone or as a finished catalyst particle, or previously used in a fully functioning reaction system. Thus the molecular sieve obtained from attrition particles or clumps from the drying step of the catalyst manufacturing process is considered virgin molecular sieve, while the molecular sieve obtained from, for example, attrition particles of an oxygenate conversion reactor system, or from the calcination step of the catalyst manufacturing process, are not considered virgin molecular sieve. Virgin molecular sieve will generally have a different, usually higher, catalytic activity than a molecular sieve that has been utilized in a fully functioning reaction system.

Similarly, the binder or equivalent material newly introduced to the catalyst manufacturing process, or that obtained from recycle of attrition particles or clumps from the catalyst manufacturing process prior to calcination is considered "virgin binder or equivalent." Virgin binder or equivalent loses its ability as a "glue" to hold new, small particles together after it has been subjected to the high temperatures associated with calcination or a reaction system, and is not considered virgin binder or equivalent after being subjected to a calcination process or a reaction system. Rather, it must be considered as a filler or other component in the method and composition of this invention.

The molecular sieve-containing catalyst attrition particles from a functioning reactor system which are incorporated into the catalyst of this invention are also referred to herein as catalyst fines. These particles are actually molecular sieve-containing catalyst particles that have be used in a functioning manufacture or reaction system, and have been reduced in size due to attrition. The catalyst fines are recovered from the manufacture or reaction system and are recycled back into the catalyst manufacturing scheme. The catalyst fines, therefore, are incorporated into the finished catalyst particles.

The molecular sieve-containing catalyst attrition particles from a functioning reactor system can also contain erosion materials from the reactor system. These materials can be metallic or non-metallic, depending upon the internal construction of the reactor system. Such materials can become incorporated into the attrition particles through contact of the catalyst with the components of the reactor system. These erosion materials include aluminum (particularly alumina), iron, cobalt, vanadium, nickel, silicon (particularly silica) or combinations thereof It is desired in this invention that the non-virgin catalyst fines incorporated into the finished catalyst particle have a measurable catalytic activity for methanol conversion relative to the catalytic activity of the virgin molecular sieve incorporated into the finished catalyst particle. Specifically, the catalyst activity ratio of non-virgin catalyst fines (NVF) relative to virgin molecular sieve (VS), $k_{NVF}/k_{VS}$, should be at least about 0.05, more preferably at least about 0.15, and most desirably at least about 0.30.

The catalyst activity ratio $k_{NVF}/k_{VS}$ for methanol conversion is determined at 350° C. and 40 psia in a pulse-type reactor apparatus. To determine catalyst activity ratio, 50 mg of virgin molecular sieve or non-virgin catalyst fines is loaded into a reactor tube, nominally about 12 mm o.d. by about 120 mm in length. The catalyst is first treated by flowing helium gas at 500° C. and greater than one atmosphere pressure for an hour, and then the catalyst is subjected at 350° C. and a vacuum of no greater than $10^{-2}$ torr for about 1 hour. Then one, 3 microliter pulse of substantially pure methanol is passed across the 50 mg of virgin molecular sieve or non-virgin catalyst fines, and the conversion of methanol is determined by analyzing, with a suitable gas chromatograph, a portion of the total vapor product before any condensation is allowed to occur. First order reaction kinetics are assumed, and thus the catalyst activity index $k_{NVF}/k_{VS}$ is determined as ln(1-methanol conversion fraction using non-virgin catalyst fines) ln(1-methanol conversion fraction using virgin molecular sieve).

The attrition particles that are to be used in the catalyst of this invention should be of a diameter effective to form a finished catalyst particle without significantly affecting the hardness of the finished catalyst. Desirably, the finished catalyst particle of the present invention will be of generally spherical shape and have an average particle diameter of between about 20 microns and 3,000 microns, more preferably about 30 microns and 200 microns, most preferably about 50 microns and 150 microns. The non-virgin attrition particles desirably have an average particle diameter of not greater than about 40% of the average particle diameter of the finished catalyst, preferably not greater than about 25%, more preferably not greater than about 10%. There is no size limitation on the size of virgin materials, for example, fines or clumps, as those materials generally redissolve into solution when mixed with the virgin molecular sieve, virgin binder, water and other materials for introduction to the drying step. A desired method of determining average particle diameter is a laser scattering technique, but microscopy and other techniques are suitable.

A finished catalyst particle of a substantially larger size can also be provided. For example, a common catalyst particle has a cylinder-like shape of about ⅛ in. diameter and ¼ in. or longer length, generally for application in fixed reactor beds. Similarly, it is possible to utilize the attrition particles generated from such large catalyst particles in the composition and method of the invention. A myriad of other finished catalyst particle geometries and sizes are also acceptable.

To add strength to the finished catalyst particles, the attrition particles are desirably substantially free of coke (i.e., carbonaceous material which forms on the catalyst during the reaction process). Preferably, the attrition particles will have an average coke content of not greater than about 10 wt. % based on the average total weight of the attrition particles, more preferably not greater than about 5 wt. %, most preferably not greater than about 1 wt. %. If the coke content of the attrition particles is higher than desired, some or all of the coke can be removed by contacting with an oxygen containing gas, e.g., air, at a temperature sufficiently high to combust the coke. For example, coked attrition particles can be contacted with air at a temperature of between about 250° C. and about 700° C. until the desired amount of coke is removed.

The finished catalyst of this invention is preferably formed by mixing the attrition particles or clumps and virgin molecular sieve with a virgin binder and drying the mixture to form the finished catalyst particles. Although it is desired to mix together the non-virgin or virgin catalyst fines (attrition particles) or clumps with virgin molecular sieve and virgin binder or equivalent to form the catalyst, the catalyst fines can be mixed with virgin molecular sieve precursor materials, heated and dried. By sieve precursor materials is meant the reactive silicon, aluminum and phosphorus components, along with at least one template, used to form the virgin molecular sieve, as described above. An appropriate mix of precursor materials will form virgin molecular sieve without significantly affecting the attrition particles. The result will be a composite of attrition particles and virgin molecular sieve.

Conventional drying methods can be used. Examples of conventional methods include, air drying, heat drying, spray drying, fluidized bed drying, or combinations of two or more thereof can be used.

One particularly desirable technique for the production of a particulate sorbent or catalyst suitable for use in fluidized-beds is the spray drying process. This process has been employed in the production of various catalysts, particularly fluid cracking catalysts and catalysts for converting oxygenates to olefins. Spray drying offers a number of advantages over granulation or agglomeration particulate-forming processes. For example, spray drying can be readily scaled to commercial production to produce large quantities of a product. Spray drying facilitates the addition of other additives and reagents to the composition since additional reagents can simply be added to a slurry prior to spray drying. Spray drying can also provide particles of highly uniform size and shape. In the production of fluidized bed catalysts, the uniformity of the particulate product results in improved process economics in the form of a higher product yield. In many cases, conventional spray drying techniques can provide nearly a 100 percent yield of particles having a size suitable for use in a fluidized bed. In such cases, little, if any, of the spray dried particles need to be discarded as waste.

An example of a spray drying process is disclosed in U.S. Pat. No. 4,946,814, the description of which is incorporate herein by reference. This process uses an acid stable surfactant with a silica-sol binder system to provide molecular sieve catalysts of significantly improved morphology, selectivity, and attrition resistance. The acid stable surfactant can be added to any one, or all, of the final slurry components including the alumina-silica sol slurry, the clay slurry, the alumina and/or a zeolite slurry. Many other binders are suitable for use in the present invention, for example, alumina chlorhydryl, AlClOH. In addition, components that are classically considered fillers, such as bentonite clay, can simultaneously serve as a binder and filler, eliminating the need for a dedicated binder such as alumina chlorhydryl.

Other materials can also be added to the mixture containing the catalyst particles during the manufacturing process. Such materials can be various inert or catalytically inactive materials, also known herein as fillers, or various additional binder materials. These materials include compositions such as kaolin and other clays, various forms of rare earth metals, metal oxides, other non-zeolite catalyst components, zeolite catalyst components, alumina or alumina sol, titania, zirconia, magnesia, thoria, beryllia, quartz, silica or silica/alumina or silica sol, and mixtures thereof These components are also effective in reducing, inter alia, overall catalyst cost, acting as a thermal sink to assist in heat shielding the catalyst during regeneration, densifying the catalyst and increasing catalyst strength. It is particularly desirable that the inert materials that are used in the catalyst to act as a thermal sink have a heat capacity of from about 0.05 cal/g-° C. to about 1 cal/g-° C., more preferably from about 0.1 cal/g-° C. to about 0.8 cal/g-° C., most preferably from about 0.1 cal/g-° C. to about 0.5 cal/g-° C.

Additional molecular sieve materials can be included as a part of the catalyst composition or they can be used as separate molecular sieve catalysts in admixture with the finished catalyst if desired. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof Structural types of medium pore molecular sieves that are suitable for use in this invention include MFI, MEL, MIW, EUO, MT, HEU, FER, AFO, AEL, TON, and substituted forms thereof These small and medium pore molecular sieves are described in greater detail in the *Atlas of Zeolite Structural Types*, W. M. Meier and D. H. Olsen, Butterworth Heineman, 3rd ed., 1997, the detailed description of which is expressly incorporated herein by reference. Desired molecular sieves which can be combined are silicoaluminophosphate molecular sieves, ZSM-5, ZSM-34, erionite, and chabazite. The catalyst composition preferably comprises about 1% to about 99 %, more preferably about 5% to about 90%, and most preferably about 10% to about 80%, by weight of total molecular sieve.

The catalyst of this invention can be used to dry gases and liquids; for selective molecular separation based on size and polar properties; as an ion-exchanger; as a catalyst in hydrocarbon cracking, hydrocracking, disproportionation, alkylation, isomerization, oxidation, and conversion of oxygenates to hydrocarbons; as a chemical carrier; in gas chromatography; and in the petroleum industry to remove normal paraffins from distillates. It is particularly suited for use as a catalyst in cracking, hydrocracking, disproportionation, alkylation, isomerization, oxidation, and conversion of oxygenates to hydrocarbons. Most particularly, the molecular sieve is suited for use as a catalyst in the conversion of oxygenates to hydrocarbons.

In its most desired embodiment as a catalyst in the conversion of oxygenates to hydrocarbons, a feed containing an oxygenate is contacted in a reaction zone of a reactor apparatus with a molecular sieve catalyst at process conditions effective to produce light olefins, i.e., an effective temperature, pressure, WHSV (weight hour space velocity) and, optionally, an effective amount of diluent, correlated to produce light olefins. These conditions are described in detail below. Usually, the oxygenate feed is contacted with the catalyst when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst and reaction conditions. As used herein, the term reactor includes not only commercial scale reactors but also pilot sized reactor units and lab bench scale reactor units.

Olefins can generally be produced at a wide range of temperatures. An effective operating temperature range can be from about 200° C. to 700° C. At the lower end of the temperature range, the formation of the desired olefin products may become markedly slow. At the upper end of the temperature range, the process may not form an optimum amount of product. An operating temperature of between about 300° C. and 500° C. is desired.

The process can be carried out in a dynamic bed system or any system of a variety of transport beds rather than in a fixed bed system. It is particularly desirable to operate the reaction process at high space velocities and in a fluidized bed system.

The conversion of oxygenates to produce light olefins may be carried out in a variety of large scale catalytic reactors, including, but not limited to, fluid bed reactors and concurrent riser reactors as described in *Fluidization Engineering*, D. Kunii and O. Levenspiel, Robert E. Krieger Publishing Co. NY, 1977, incorporated in its entirety herein by reference. Additionally, countercurrent free fall reactors may be used in the conversion process. See, for example, U.S. Pat. No. 4,068,136 and *Fluidization and Fluid-Particle Systems*, pages 48–59, F. A. Zenz and D. F. Othmo, Reinhold Publishing Corp., NY 1960, the descriptions of which are expressly incorporated herein by reference.

Any standard commercial scale reactor system can be used, including fixed bed or moving bed systems. The commercial scale reactor systems can be operated at a weight hourly space velocity (WHSV) of from 1 $hr^{-1}$ to 1000 $hr^{-1}$. In the case of commercial scale reactors, WHSV is defined as the weight of hydrocarbon in the feed per hour per weight of molecular sieve content of the catalyst. The hydrocarbon content will be oxygenate and any hydrocarbon which may optionally be combined with the oxygenate. The molecular sieve content is intended to mean only the molecular sieve portion that is contained within the catalyst. This excludes components such as binders, diluents, inerts, rare earth components, etc.

The pressure also may vary over a wide range, including autogenous pressures. Desired pressures are in the range of about 0.5 kPa to about 5 MPa. The foregoing pressures refer to the partial pressure of the oxygenate compounds and/or mixtures thereof.

One or more inert diluents may be present in the feedstock, for example, in an amount of from 1 molar percent to 99 molar percent, based on the total number of moles of all feed and diluent components fed to the reaction zone (or catalyst). Typical diluents include, but are not necessarily limited to helium, argon, nitrogen, carbon monoxide, carbon dioxide, hydrogen, water, paraffins, alkanes (especially methane, ethane, and propane), alkylenes, aromatic compounds, and mixtures thereof The desired diluents are water and nitrogen. Water can be injected in either liquid or vapor form.

The process may be carried out in a batch, semi-continuous or continuous fashion. The process can be conducted in a single reaction zone or a number of reaction zones arranged in series or in parallel.

The level of conversion of the oxygenates can be maintained to reduce the level of unwanted by-products. Conversion can also be maintained sufficiently high to avoid the need for commercially undesirable levels of recycling of unreacted feeds. A reduction in unwanted by-products is seen when conversion moves from 100 mol % to about 98 mol % or less. Recycling up to as much as about 50 mol % of the feed is commercially acceptable. Therefore, conversions levels which achieve both goals are from about 50 mol % to about 98 mol % and, desirably, from about 85 mol % to about 98 mol %. However, it is also acceptable to achieve conversion between 98 mol % and 100 mol % in order to simplify the recycling process. Oxygenate conversion may be maintained at this level using a number of methods familiar to persons of ordinary skill in the art. Examples include, but are not necessarily limited to, adjusting one or more of the following: the reaction temperature; pressure; flow rate (i.e., WHSV); level and degree of catalyst regeneration; amount of catalyst re-circulation; the specific reactor configuration; the feed composition; and other parameters which affect the conversion.

If regeneration is required, the molecular sieve catalyst can be continuously introduced as a moving bed to a regeneration zone where it can be regenerated, such as for example by removing carbonaceous materials or by oxidation in an oxygen-containing atmosphere. In a desired embodiment, the catalyst is subject to a regeneration step by burning off carbonaceous deposits accumulated during the conversion reactions.

The oxygenate feedstock comprises at least one organic compound which contains at least one oxygen atom, such as aliphatic alcohols, ethers, carbonyl compounds (aldehydes, ketones, carboxylic acids, carbonates, esters and the like). When the oxygenate is an alcohol, the alcohol can include an aliphatic moiety having from 1 to 10 carbon atoms, more preferably from 1 to 4 carbon atoms. Representative alcohols include but are not necessarily limited to lower straight and branched chain aliphatic alcohols and their unsaturated counterparts. Examples of suitable oxygenate compounds include, but are not limited to: methanol; ethanol; n-propanol; isopropanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof. Desired oxygenate compounds are methanol, dimethyl ether, or a mixture thereof.

The method of making the desired olefin product in this invention can include the additional step of making these oxygenates from hydrocarbons such as oil, coal, tar sand, shale, biomass and natural gas. Methods for making the compositions are known in the art. These methods include fermentation to alcohol or ether, making synthesis gas, then converting the synthesis gas to alcohol or ether. Synthesis gas can be produced by known processes such as steam reforming, autothermal reforming and partial oxidization.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are desired. Particularly desired are metallocene, Ziegler/Natta and acid catalytic systems. See, for example, U.S. Pat. Nos. 3,258,455; 3,305,538; 3,364,190; 5,892,079; 4,659,685; 4,076,698; 3,645,992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

A desired polyolefin-forming catalyst is a metallocene catalyst. The desired temperature of operation is from 50° C. to 240° C. and the reaction can be carried out at low, medium or high pressure, being anywhere from about 1 bar to 200 bars. For processes carried out in solution, an inert diluent can be used, and the desired operating pressure is from 10 bars to 150 bars, with a desired temperature range of from 120° C. to 230° C. For gas phase processes, it is desired that the temperature generally from 60° C. to 160° C., and that the operating pressure from 5 bars to 50 bars.

In addition to polyolefins, numerous other olefin derivatives may be formed from the olefins recovered therefrom. These include, but are not limited to, aldehydes, alcohols, acetic acid, linear alpha olefins, vinyl acetate, ethylene dichloride and vinyl chloride, ethylbenzene, ethylene oxide, cumene, isopropyl alcohol, acrolein, allyl chloride, propylene oxide, acrylic acid, ethylene-propylene rubbers, and acrylonitrile, and trimers and dimers of ethylene, propylene or butylenes. The methods of manufacturing these derivatives are well known in the art, and therefore, are not discussed herein.

The catalyst of this invention is particularly suitable for use in a fluidized bed reaction system. In these types of systems, the catalyst is moved throughout a reactor unit and a regenerator unit, and is subjected to a variety of mechanical and thermal stresses. As a result of these stresses, the particles generally break apart producing attrition particles. The attrition particles are generally too small to be effectively moved throughout the system repeatedly. Generally, they tend to be removed with the vapor product in the separation system, and are ultimately disposed as waste.

In this invention, the attrition particles are recovered and reused in the manufacture of new catalyst. The attrition particles can be recovered using conventional separation equipment, including but not limited to, cyclones, filters and electrostatic precipitators. In general, the separation equipment will desirably be placed in line of the product stream from the reactor or the flue gas stream from a catalyst regenerator, the attrition particles separated, and the particles will be sent to a catalyst manufacturing unit for processing into a new catalyst composition.

In one embodiment, the catalyst manufacturing process can be close coupled with a reaction system. By close coupled is meant that virtually all of the catalyst made by the catalyst manufacturing facility or facilities is dedicated to operation in a given reaction system or systems, and at least a portion of the attrition particles of the reaction systems are returned to the catalyst manufacturing facility. The manufacturing facility need not be physically located near the reaction system, but rather the catalyst and catalyst fines may be transported to and from each facility or facilities by such means as trucks or rail cars. Alternatively, the facilities may be very close to each other, and the catalyst and catalyst fines may be transported to and from each facility or facilities by mechanical or gas blown conveyor systems well known to those skilled in the art.

In a close coupled operation, if the recovered attrition particles have essentially 100% catalytic activity, as is generally the case with virgin fines and clumps, all of the attrition particles or clumps can be reused in the manufacture of new catalyst. However, catalytic activity of the non-virgin attrition particles is likely to be significantly less than 100%, and in such case, only a portion of the attrition particles could be reused. Desirably, the recovered attrition particles should have catalytic activity such that at least 10 wt. % of the recovered attrition particles can be recycled, preferably at least 20 wt. %, and most preferably at least 40% wt. %.

In another embodiment, the catalyst manufacturing facility may be decoupled from any particular reaction system, although preferably, the type of molecular sieve in the catalyst made by the catalyst manufacturing facility and the type of catalyst in the catalyst used in the reaction system are the same, e.g., SAPO-34, or similar, e.g., SAPO-34 and SAPO-18. In this decoupled embodiment, catalyst fines may be obtained at any rate and interval, subject to economic and facility constraints and optimums. In such an operation, there is no desired level of how much catalyst fines should be utilized from a given reaction system. However, regardless of the source of catalyst fines, it is desired in this invention that the catalyst comprise at least about 10% catalyst fines from a reaction system, more preferably at least about 20%, and most desirably at least about 40%.

An example of recovering and processing the attrition particles is shown in FIG. 1. Virgin molecular sieve, virgin binders and fillers are introduced via a stream 10 into a catalyst unit 11. Catalyst unit 11 is a conventional unit in which sieve is mixed with binder and filler, and the mixture is dried and calcined to produce a finished catalyst particle. Once the catalyst 16 is formed, it is sent to a reaction system 12 for use as a catalyst in the system. The reaction system 12 can be any conventional system which incorporates the use of a molecular sieve catalyst. In such a system, attrition takes place, reducing the size of the molecular sieve catalyst particles.

When the molecular sieve catalyst particles become significantly reduced in size as a result of attrition, they are recovered by conventional means such as by the use of an appropriately sized cyclone, electrostatic precipitator, flue gas wash scrubber, or filter press. Once the attrition particles are separated and recovered as stream 13, at least a portion of the particles can be recycled back to the catalyst manufacturing unit 11 as stream 14 to be incorporated into the manufacture of additional catalyst particles. A portion of the attrition particles will be purged as stream 15.

Figure 2:
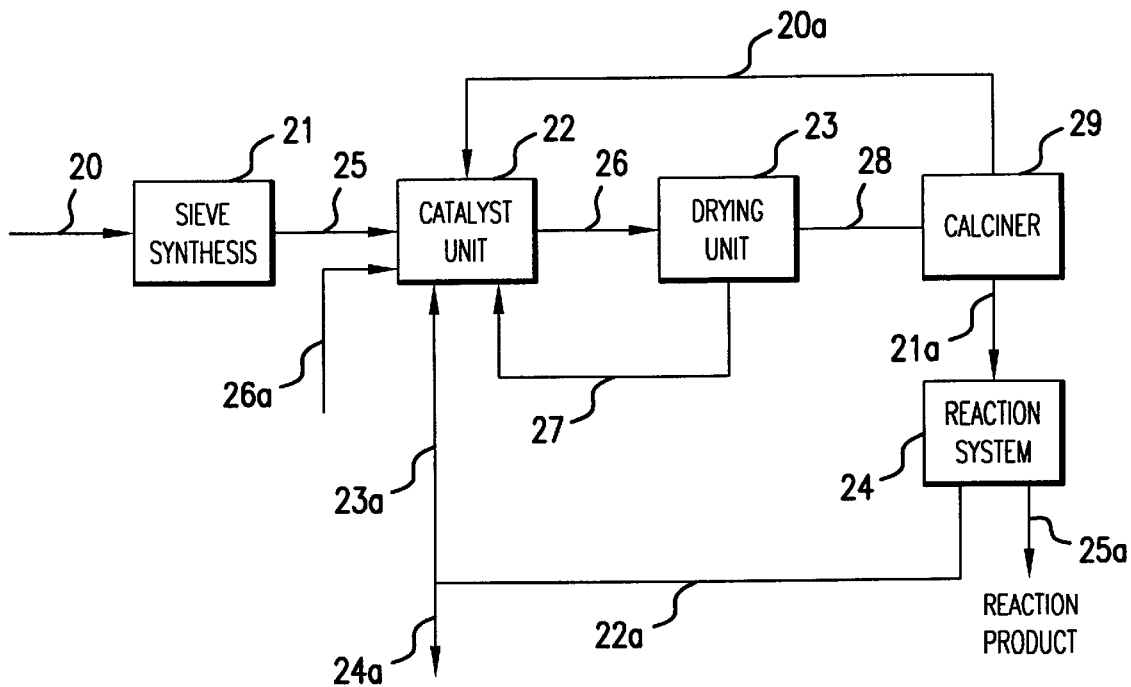
FIG. 2 shows a general recovery scheme of attrition particles from a catalyst manufacturing process and a reaction process.

Another example is shown in FIG. 2. In this desired embodiment, sieve precursor materials are sent through a line 20 to a sieve synthesis unit 21. In this unit, a reaction mixture is formed by mixing together one or more of a reactive silicon, aluminum or phosphorus component, along with at least one template. Generally, the mixture is sealed and heated, preferably under autogenous pressure, to a temperature of at least about 100° C., preferably from about 100 to 250° C., until a crystalline product is formed. Formation of the crystalline product can take anywhere from around 2 hours to as much as 2 weeks. In some cases, stirring or seeding with crystalline material will facilitate the formation of the product.

Typically, the molecular sieve formed in the sieve synthesis unit 21 will be formed in solution. It can be recovered by conventional means, such as by centrifugation or filtration. The product can also be washed, recovered by the same means and dried.

Once the molecular sieve 25 is formed in the sieve synthesis unit 21, it is sent to a catalyst unit 22 for combining with virgin binders and fillers 26a, and attrition particles virgin attrition particles, or clumps 27 from the drying unit 23, and non-virgin attrition particles 20a from the calciner 29, and 23a from the reaction system 24. The components are mixed together and sent to a drying unit 23, and dried according to conventional means. During the drying process in the drying unit 23, catalyst particles 27 which are considered to be too small for use in a reaction system, are recovered and recycled back to catalyst unit 22.

Product 28 from the drying unit 23 is sent to catalyst calciner 29. Attrition particles 20a are sent to the catalyst unit 22, and desired catalyst particles 21a are sent to a reaction system 24, which generates a reaction product 25a. During a typical reaction process, attrition of the catalyst results, forming attrition particles 22a. These attrition particles 22a are separated from the reaction system and split into two streams, 23a which is recycled back to the catalyst unit 22, and a purge stream 24a. Thus, in this embodiment, the catalyst unit 22 receives catalyst attrition particles recycled from both the catalyst manufacturing process and a catalyst reaction process.

Figure 3:
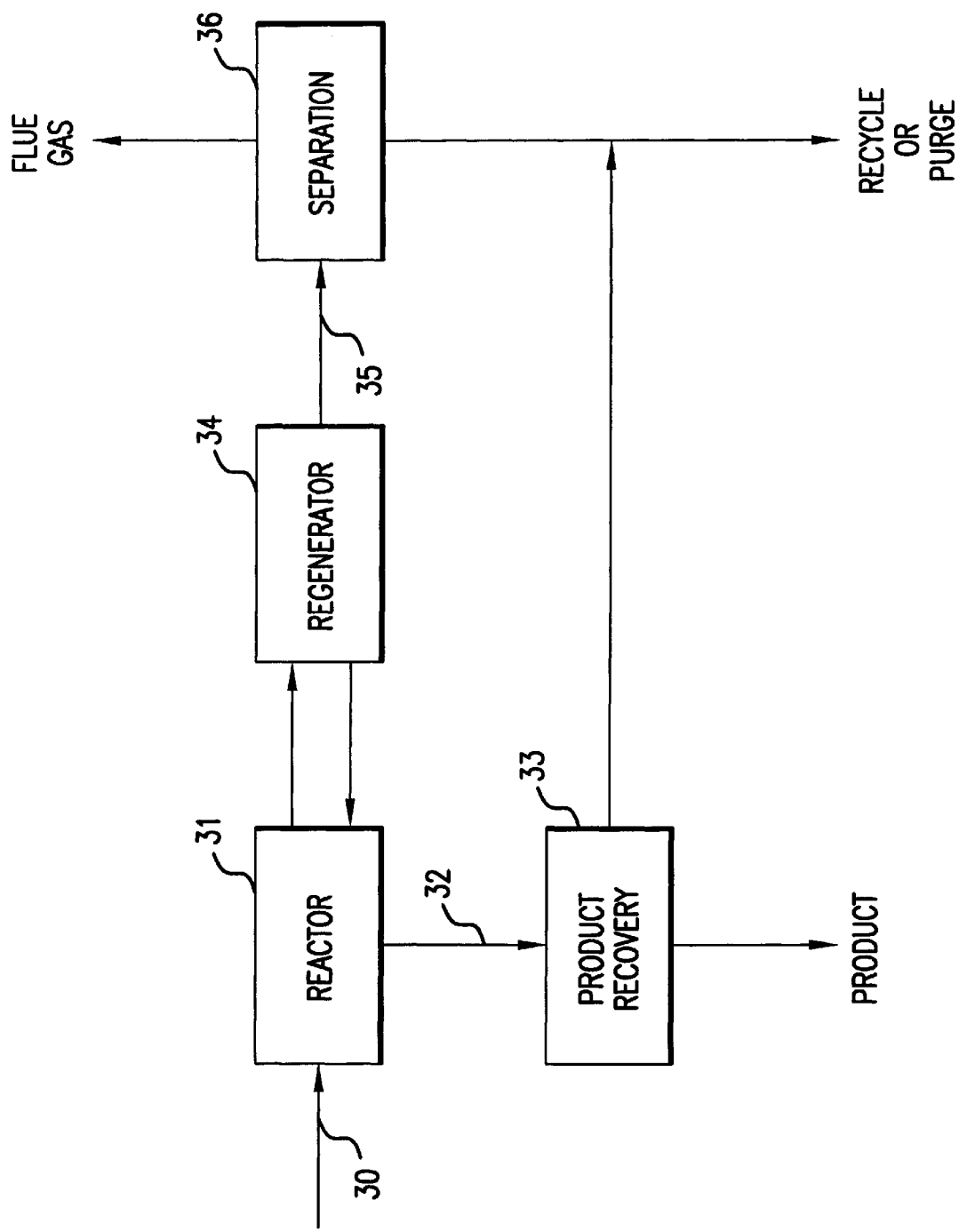
FIG. 3 shows a recovery scheme of a desired embodiment where the catalyst reaction system is an oxygenate to olefins catalytic process, and the process includes both a reaction unit and a regeneration unit.

Another, desired embodiment is shown in FIG.3. In this embodiment, catalyst containing molecular sieve attrition particles and virgin molecular sieve are fed via line 30 into a reactor unit 31. Preferably, the reactor unit 31 is a fluid catalytic cracking reactor or a fluidized bed reactor and is used in a process of making olefins from an oxygenate feed.

The product from the reactor unit 31 is recovered and sent through a line 32 to a product recovery unit 33. Typically, attrition particles can be found accompanying the product through line 32. This being the case, the attrition particles can be recovered in a product recovery unit 33 using conventional means. The attrition particles are separated from the reaction product and recycled in the manufacture of new catalyst or purged as required.

A portion of the catalyst in the reactor unit 31 will typically need to be regenerated. This regeneration occurs by sending "coked" catalyst to a regenerator 34, where the coke is removed. In a well functioning process, the regenerated catalyst will be recycled back to the reactor 31.

Light gasses, such as found in flue gas, are also recovered from the regenerator 34. In many cases, attrition particles will be recovered along with the flue gas. In such instances, the flue gas can be sent through a line 35 to a separation unit 36. In the separation unit 36, conventional means are used to separate and recover attrition particles. The attrition particles are then recycled to catalyst manufacture or purged as appropriate.

The correct proportions of virgin molecular sieve and virgin binder (whether from newly made materials or from recycled attrition particles or clumps), and non-virgin molecular sieve and catalyst attrition particles is a straightforward algebraic determination. The parameters are set by the desired properties and rates of the product catalyst and the given properties and rates of the non-virgin attrition particles to be incorporated into the catalyst as desired.

This invention will be better understood with reference to the following examples, which are intended to illustrate specific embodiments within the overall scope of the invention as claimed.

EXAMPLE 1

Referring to FIG. 1, a catalyst unit 11 operates to manufacture 1000 lb/day SAPO-34 catalyst 16 in a continuous manner for use in reactor system 12 which is a fluidized bed oxygenate conversion reaction system. The SAPO-34 catalyst 16 is comprised of recycle attrition particles, binder and fillers, and exhibits a catalyst activity ratio of 0.50. In the course of operation of reaction system 12, 1000 lb/day of catalyst fines 13 are generated, having a catalyst activity ratio of 0.40; 20 % of the original catalyst activity has been lost in the reaction system (((0.50–0.40) /0.50)×100). 400 lb/day of catalyst fines 14 are continuously provided to catalyst unit 11, while 600 lb/day of catalyst fines 15 are discarded. In the catalyst unit 11, 10% binder is used in the mixture to be dried into finished catalyst particles to provide a desired particle strength.

From the above information, the correct proportions of all materials to catalyst unit 11 to produce the desired catalyst 16 at the desired rate can be calculated. For example, the catalyst 16 contains 50% active sieve, equal to 500 lb/day of active sieve (1000 lb/day×0.5 catalyst activity ratio), and 160 lb/day of active sieve comes from the recycled attrition particles 14 (400 lb/day×0.4 catalyst activity ratio; the 20% difference in catalyst activity from the original material 16, representing essentially 20% inactive catalyst, is counted as filler). Thus, the virgin molecular sieve in stream 10 comprises the difference of 340 lb/day. In addition, the catalyst 16 contains 10% binder, equal to 100 lb/day (1000 lb/day× 0.1 binder fraction) and the balance of stream of catalyst 16 is 400 lb/day of filler (1000 lb/day−500 lb/day active sieve− 100 lb/day filler). Since 240 lb day of that filler came from recycled catalyst attrition particles 14 (400 lb/day−160 lb/day active sieve), the amount of filler produced in stream 10 is 160 lb/day (400 lb/day filler in stream of catalyst of 16 lb/day to 240 lb/day filler from stream 14).

Having now fully described this invention, it will be appreciated by those skilled in the art that the invention can be performed within a wide range of parameters within what is claimed, without departing from the spirit and scope of the invention:

What is claimed is:

1. A catalyst composition comprising:
   molecular sieve-containing catalyst attrition particles;
   virgin molecular sieve; and
   binder.

2. The catalyst of claim 1, wherein the virgin molecular sieve comprises dried catalyst fines in catalyst clumps.

3. The catalyst of claim 1, wherein the molecular sieve-containing catalyst attrition particles are calcined molecular sieve catalyst particles which comprise molecular sieve and binder.

4. The catalyst of claim 1, wherein the molecular sieve-containing catalyst attrition particles have a catalytic activity of at least 25%.

5. The catalyst of claim 1, wherein the catalyst composition has an average particle diameter ranging from 40 $\mu$m to 150 $\mu$m, and the molecular sieve-containing catalyst attrition particles have an average particle diameter of less than 20% of the average particle diameter of the catalyst composition.

6. The catalyst of claim 1, wherein the molecular sieve-containing catalyst attrition particles comprise less than 20 wt. % coke.

7. The catalyst of claim 1, wherein the molecular sieve of the molecular sieve-containing catalyst attrition particles is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof.

8. The catalyst of claim 7, wherein the virgin molecular sieve is SAPO-34.

9. The catalyst of claim 1, wherein the molecular sieve in the molecular sieve-containing catalyst attrition particles and the virgin molecular sieve have the same framework composition.

10. The catalyst of claim 1, wherein the molecular sieve in the molecular sieve-containing catalyst attrition particles and the virgin molecular sieve have different framework compositions.

11. The catalyst of claim 1, further comprising erosion material selected from the group consisting of alumninum, iron, cobalt, vanadium, nickel, silicon, and combinations thereof.

12. A method of making a molecular sieve catalyst composition comprising:
   mixing together molecular sieve-containing catalyst attrition particles, virgin molecular sieve components and binder; and
   spray drying the mixture to form the molecular sieve catalyst composition.

13. The method of claim 12, wherein the virgin molecular sieve component comprises dried catalyst fines or catalyst clumps.

14. The method of claim 12, wherein the molecular sieve-containing catalyst attrition particles comprise molecular sieve and binder.

15. The method of claim 12, where the molecular sieve-containing catalyst attrition particles comprise erosion material selected from the group consisting of aluminum, iron, cobalt, vanadium, nickel, silicon, and combinations thereof.

16. The method of claim 12, wherein the molecular sieve-containing catalyst attrition particles have a catalytic activity of at least 25%.

17. The method of claim 12, wherein the catalyst composition has an average particle diameter ranging from 40 μm to 150 μm, and the molecular sieve-containing catalyst attrition particles have an average particle diameter of less than 20% of the average particle diameter of the catalyst composition.

18. The method of claim 12, wherein the molecular sieve-containing catalyst attrition particles comprise less than 20 wt. % coke.

19. The method of claim 12, wherein the molecular sieve of the molecular sieve-containing catalyst attrition particles is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof.

20. The method of claim 19, wherein the virgin molecular sieve is selected from the group consisting of SAPO-34.

21. The method of claim 12, wherein the molecular sieve in the molecular sieve-containing catalyst attrition particles and the virgin molecular sieve have the same framework composition.

22. The method of claim 12, wherein the molecular sieve in the molecular sieve-containing catalyst attrition particles and the virgin molecular sieve have different framework compositions.

* * * * *